(12) United States Patent
Yamashita et al.

(10) Patent No.: US 10,601,042 B2
(45) Date of Patent: Mar. 24, 2020

(54) SECONDARY BATTERY POSITIVE ELECTRODE ACTIVE MATERIAL AND METHOD FOR PRODUCING SAME

(71) Applicant: TAIHEIYO CEMENT CORPORATION, Minato-ku (JP)

(72) Inventors: Hiroki Yamashita, Sakura (JP); Tomoki Hatsumori, Sakura (JP); Atsushi Nakamura, Sakura (JP); Takaaki Ogami, Sakura (JP)

(73) Assignee: TAIHEIYO CEMENT CORPORATION, Minato-ku (JP)

( * ) Notice: Subject to any disclaimer, the term of this patent is extended or adjusted under 35 U.S.C. 154(b) by 119 days.

(21) Appl. No.: 15/560,749

(22) PCT Filed: Sep. 17, 2015

(86) PCT No.: PCT/JP2015/076385
§ 371 (c)(1),
(2) Date: Sep. 22, 2017

(87) PCT Pub. No.: WO2016/151890
PCT Pub. Date: Sep. 29, 2016

(65) Prior Publication Data
US 2018/0083280 A1    Mar. 22, 2018

(30) Foreign Application Priority Data

Mar. 24, 2015 (JP) ................................ 2015-060578
Sep. 10, 2015 (JP) ................................ 2015-178161

(51) Int. Cl.
| | | |
|---|---|---|
| *H01M 4/583* | (2010.01) | |
| *H01M 4/36* | (2006.01) | |
| *H01M 4/62* | (2006.01) | |
| *H01M 4/04* | (2006.01) | |
| *C01B 25/45* | (2006.01) | |
| *C01B 33/32* | (2006.01) | |
| *H01M 4/1397* | (2010.01) | |
| *H01M 4/58* | (2010.01) | |
| *H01M 4/136* | (2010.01) | |
| *C01B 32/20* | (2017.01) | |
| *H01M 10/052* | (2010.01) | |
| *H01M 10/054* | (2010.01) | |
| *H01M 10/0525* | (2010.01) | |
| *H01M 4/02* | (2006.01) | |

(52) U.S. Cl.
CPC ............ *H01M 4/583* (2013.01); *C01B 25/45* (2013.01); *C01B 32/20* (2017.08); *C01B 33/32* (2013.01); *H01M 4/04* (2013.01); *H01M 4/0471* (2013.01); *H01M 4/136* (2013.01); *H01M 4/1397* (2013.01); *H01M 4/362* (2013.01); *H01M 4/5825* (2013.01); *H01M 4/625* (2013.01); *C01P 2006/40* (2013.01); *H01M 10/052* (2013.01); *H01M 10/054* (2013.01); *H01M 10/0525* (2013.01); *H01M 2004/028* (2013.01)

(58) Field of Classification Search
CPC ...... H01M 4/04; H01M 4/043; H01M 4/0471; H01M 4/136; H01M 4/1397; H01M 4/362; H01M 4/5825; H01M 4/583; H01M 4/625; H01M 2004/028; H01M 10/052; H01M 10/0525; H01M 10/054; C01B 25/45; C01B 32/20; C01B 33/32; C01P 2006/40
See application file for complete search history.

(56) References Cited

U.S. PATENT DOCUMENTS

| | | |
|---|---|---|
| 2011/0008233 A1 | 1/2011 | Miyanaga et al. |
| 2012/0015249 A1 | 1/2012 | Awano et al. |
| 2012/0091405 A1 | 4/2012 | Yamakaji et al. |
| 2012/0129052 A1 | 5/2012 | Bauer et al. |
| 2014/0141332 A1 | 5/2014 | Nemoto et al. |
| 2014/0339465 A1 | 11/2014 | Okamoto |

(Continued)

FOREIGN PATENT DOCUMENTS

| | | | |
|---|---|---|---|
| CA | 2 794 290 A1 | 4/2014 | |
| EP | 2 966 713 A1 | 1/2016 | |

(Continued)

OTHER PUBLICATIONS

English translation of JP Publication 2013-225471, Oct. 2013.*

(Continued)

*Primary Examiner* — Brittany L Raymond
(74) *Attorney, Agent, or Firm* — Oblon, McClelland, Maier & Neustadt, L.L.P.

(57) ABSTRACT

The present invention provides a positive electrode active substance for a secondary cell, the positive electrode active substance capable of suppressing adsorption of water effectively in order to obtain a high-performance lithium ion secondary cell or sodium ion secondary cell. The present invention also provides a method for producing the positive electrode active substance for a secondary cell. That is, the present invention is a positive electrode active substance for a secondary cell, in which a water-insoluble electrically conductive carbon material and carbon obtained by carbonizing a water-soluble carbon material are supported on a compound containing at least iron or manganese, the compound represented by formula (A) $LiFe_aMn_bMn^1{}_cPO_4$, formula (B) $Li_2Fe_dMn_eM^2{}_fSiO_4$, or formula (C) $NaFe_gMn_hQ_iPO_4$.

12 Claims, No Drawings

(56) References Cited

U.S. PATENT DOCUMENTS

| | | | |
|---|---|---|---|
| 2015/0037673 A1 | 2/2015 | Zaghib et al. | |
| 2015/0174790 A1 | 6/2015 | Yamakaji et al. | |
| 2015/0200395 A1* | 7/2015 | Stevanovic | B01F 3/1214 |
| | | | 429/163 |
| 2015/0270554 A1 | 9/2015 | Gariepy et al. | |
| 2016/0013474 A1 | 1/2016 | Liu et al. | |
| 2016/0141607 A1* | 5/2016 | Park | H01M 4/366 |
| | | | 429/213 |

FOREIGN PATENT DOCUMENTS

| | | | |
|---|---|---|---|
| JP | 2003-292309 A | | 10/2003 |
| JP | 2008-130526 A | | 6/2008 |
| JP | 2008-260666 A | | 10/2008 |
| JP | 2010-218884 A | | 9/2010 |
| JP | 2011-34963 A | | 2/2011 |
| JP | 2011-181486 A | | 9/2011 |
| JP | 2011-210693 A | | 10/2011 |
| JP | 2012-527067 A | | 11/2012 |
| JP | 2013-152911 A | | 8/2013 |
| JP | 2013-225471 | * | 10/2013 |
| JP | 2013-225471 A | | 10/2013 |
| JP | 2014-191873 | | 10/2014 |
| JP | 2014-532263 A | | 12/2014 |
| WO | WO 2013/128936 A1 | | 9/2013 |
| WO | WO 2014-063244 | * | 5/2014 |
| WO | WO 2014/063244 A1 | | 5/2014 |
| WO | WO 2014/134969 A1 | | 9/2014 |
| WO | WO 2015/003568 A1 | | 1/2015 |

OTHER PUBLICATIONS

Extended European Search Report dated Jul. 10, 2018 in European Patent Application No. 15886442.1, citing documents AA-AD, AO-AR, & AX therein, 10 pages.
Ellis, B. L. et al., "Sodium and sodium-ion energy storage batteries", Current Opinion in Solid State and Materials Science, XP028401981, vol. 16, No. 4, Apr. 26, 2012, pp. 168-177.
International Search Report dated Dec. 22, 2015 in PCT/JP2015/076385 filed Sep. 17, 2015.
Guohui Qin, et al., "C/LiFePO$_4$/multi-walled carbon nanotube cathode material with enhanced electrochemical performance for lithium-ion batteries," Journal of Power Sources, vol. 248, 2014, pp. 588-595.
Dan Zhao, et al., "Electrochemical performance comparison of LiFePO$_4$ supported by various carbon materials," Electrochimica Acta, vol. 88, 2013, pp. 632-638.
Office Action dated Nov. 26, 2018 in Taiwanese Patent Application No. 104130844.

* cited by examiner

SECONDARY BATTERY POSITIVE ELECTRODE ACTIVE MATERIAL AND METHOD FOR PRODUCING SAME

FIELD OF THE INVENTION

The present invention relates to a positive electrode active substance for a secondary cell, wherein both a water-insoluble electrically conductive carbon material and carbon obtained by carbonizing a water-soluble carbon material are supported on a compound, and a method for producing the positive electrode active substance for a secondary cell.

BACKGROUND OF THE INVENTION

Development of secondary cells for use in portable electronic devices, hybrid vehicles, electric vehicles, or the like is conducted, and lithium ion secondary cells in particular are widely known as the most excellent secondary cell which operates at around room temperature. In such circumstances, lithium-containing olivine type metal phosphates such as Li(Fe, Mn)$PO_4$ and $Li_2$(Fe, Mn)$SiO_4$ are not greatly affected by resource restriction and exhibit higher safety when compared with lithium transition metal oxides such as $LiCoO_2$, and therefore become optimal positive electrode materials for obtaining high-output and large-capacity lithium ion secondary cells. These compounds, however, have a characteristic that it is difficult to enhance electrical conductivity sufficiently due to their crystal structures, and moreover, there is room for improvement in diffusibility of lithium ions, so that various kinds of development have been conducted conventionally.

Further, in lithium ion secondary cells the spread of which is progressing, a phenomenon is known that when the cells are left to stand for long hours after charge, the internal resistance gradually increases to cause deterioration in cell performance. The phenomenon occurs because water contained in cell materials at the time of production is desorbed from the materials during repetition of charge and discharge of the cell, and hydrogen fluoride is produced through the chemical reaction between the desorbed water and nonaqueous electrolytic solution $LiPF_6$ with which the cell is impregnated. To suppress the deterioration in cell performance effectively, it is also known that it is effective to reduce the water content in a positive electrode active substance for use in a secondary cell (see Patent Literature 1).

Under the circumstance, for example, Patent Literature 2 discloses a technique for reducing the water content to a predetermined value or less by conducting pulverization treatment or classification treatment under a dry atmosphere after pyrolysis treatment of a raw material mixture comprising a precursor of a carbonaceous substance. Further, Patent Literature 3 discloses a technique for obtaining a composite oxide in which an electrically conductive carbon material is precipitated on the surface of the composite oxide uniformly by conducting mechanochemical treatment after mixing a predetermined lithium phosphate compound, lithium silicate compound, or the like with an electrically conductive carbon material using a wet ball mill.

On the other hand, lithium is a rare and valuable substance, and therefore various studies on sodium ion secondary cells using sodium in place of lithium ion secondary cells have started.

For example, Patent Literature 4 discloses an active substance for a sodium secondary cell using malysite type Na$MnPO_4$, Patent Literature 5 discloses a positive electrode active substance comprising a sodium transition metal phosphate having an olivine type structure, and both the literatures show that a high-performance sodium ion secondary cell is obtained.

CITATION LIST

Patent Literature

[Patent Literature 1] JP-A-2013-152911
[Patent Literature 2] JP-A-2003-292309
[Patent Literature 3] JP-A-2010-218884
[Patent Literature 4] JP-A-2008-260666
[Patent Literature 5] JP-A-2011-34963

SUMMARY OF THE INVENTION

Technical Problem

However, in any of the techniques described in the literatures, it found that because the surface of a positive electrode active substance for a secondary cell is not still completely covered with a carbon source and a portion of the surface is exposed, the adsorption of water cannot be suppressed and the water content is increased, and that it is difficult to obtain a positive electrode active substance for a secondary cell having a sufficiently high level of cell physical properties, such as cycle properties.

Accordingly, the subject matter of the present invention is to provide: a positive electrode active substance for a secondary cell, which can suppress the adsorption of water effectively in order to obtain a high-performance lithium ion secondary cell or sodium ion secondary cell; and a method for producing the positive electrode active substance for a secondary cell.

Solution to Problem

Thus, the present inventors have conducted various studies to find that a positive electrode active substance for a secondary cell, wherein an electrically conductive carbon powder and carbon obtained by carbonizing a water-soluble carbon material are supported on a particular compound, can suppress the adsorption of water effectively because carbon derived from a plurality of carbon sources covers the surface of the compound efficiently and therefore is extremely useful as a positive electrode active substance for a secondary cell, in which lithium ions or sodium ions can contribute to electrical conduction effectively. As a result that, they have completed the present invention.

That is, the present invention provides a positive electrode active substance for a secondary cell, wherein a water-insoluble electrically conductive carbon material and carbon obtained by carbonizing a water-soluble carbon material are supported a compound containing at least iron or manganese, the oxide represented by formula (A), (B), or (C):

wherein $M^1$ represents Mg, Ca, Sr, Y, Zr, Mo, Ba, Pb, Bi, La, Ce, Nd, or Gd, and a, b, and c each represent a number satisfying 0≤a≤1, 0≤b≤1, 0≤c≤0.2, 2a+2b+(valence of $M^1$)× c=2, and a+b≠0;

wherein $M^2$ represents Ni, Co, Al, Zn, V, or Zr, and d, e, and f each represent a number satisfying $0 \le d \le 1$, $0 \le e \le 1$, $0 \le f < 1$, $2d+2e+(\text{valence of } M^2) \times f = 2$, and $d+e \ne 0$; and $$NaFe_gMn_hQ_iPO_4 \qquad (C)$$

wherein Q represents Mg, Ca, Co, Sr, Y, Zr, Mo, Ba, Pb, Bi, La, Ce, Nd, or Gd, and g, h, and i each represent a number satisfying $0 \le g \le 1$, $0 \le h \le 1$, $0 \le i < 1$, $2g+2h+(\text{valence of } Q) \times i = 2$, and $g+h \ne 0$.

Moreover, the present invention provides a method for producing a positive electrode active substance for a secondary cell, the positive electrode active substance being one wherein a water-insoluble electrically conductive carbon material and carbon obtained by carbonizing a water-soluble carbon material are supported on a compound containing at least iron or manganese, the compound represented by formula (A), (B), or (C):

$$LiFe_aMn_bM^1_cPO_4 \qquad (A)$$

wherein $M^1$ represents Mg, Ca, Sr, Y, Zr, Mo, Ba, Pb, Bi, La, Ce, Nd, or Gd, and a, b, and c each represent a number satisfying $0 \le a \le 1$, $0 \le b \le 1$, $0 \le c \le 0.2$, $2a+2b+(\text{valence of } M^1) \times c = 2$, and $a+b \ne 0$;

$$Li_2Fe_dMn_eM^2_fSiO_4 \qquad (B)$$

wherein $M^2$ represents Ni, Co, Al, Zn, V, or Zr, and d, e, and f each represent a number satisfying $0 \le d \le 1$, $0 \le e \le 1$, $0 \le f < 1$, $2d+2e+(\text{valence of } M^2) \times f = 2$, and $d+e \ne 0$; and $$NaFe_gMn_hQ_iPO_4 \qquad (C)$$

wherein Q represents Mg, Ca, Co, Sr, Y, Zr, Mo, Ba, Pb, Bi, La, Ce, Nd, or Gd, and g, h, and i each represent a number satisfying $0 \le g \le 1$, $0 \le h \le 1$, $0 \le i < 1$, $2g+2h+(\text{valence of } Q) \times i = 2$, and $g+h \ne 0$, and the method comprising:

a step (I) of subjecting slurry comprising: a lithium compound or a sodium compound; a phosphoric acid compound or a silicic acid compound- and a metal salt comprising at least an iron compound or a manganese compound to hydrothermal reaction, thereby obtaining an compound X;

a step (II) of adding a water-insoluble electrically conductive carbon material to the obtained compound X and conducting dry mixing, thereby obtaining a composite Y; and a step (III) of adding a water-soluble carbon material to the obtained composite Y before wet mixing and then conducting pyrolyzing.

Effects of the Invention

According to the present invention, when a water-insoluble electrically conductive carbon material and carbon obtained by carbonizing a water-soluble carbon material are effectively supported complementing each other on a predetermined compound, the exposure of the compound in a portion of the surface of the compound due to the absence of carbon is suppressed effectively, so that a positive electrode active substance for a secondary cell, wherein the exposed portion on the surface of the compound is reduced effectively, can be obtained. Therefore, the positive electrode active substance can suppress the adsorption of water effectively, so that, in a lithium ion secondary cell or a sodium ion secondary cell using the positive electrode active substance, excellent cell properties, such as cycle properties can be exhibited stably even under various use environments, while effectively contributing lithium ions or sodium ions to electrical conduction.

DETAILED DESCRIPTION OF THE INVENTION

Hereinafter, the present invention will be described in detail.

The compound for use in the present invention comprises at least iron or manganese and is represented by any of the following formulas (A), (B), and (C):

$$LiFe_aMn_bM^1_cPO_4 \qquad (A)$$

wherein $M^1$ represents Mg, Ca, Sr, Y, Zr, Mo, Ba, Pb, Bi, La, Ce, Nd, or Gd, and a, b, and c each represent a number satisfying $0 \le a \le 1$, $0 \le b \le 1$, $0 \le c \le 0.2$, $2a+2b+(\text{valence of } M^1) \times c = 2$, and $a+b \ne 0$;

$$Li_2Fe_dMn_eM^2_fSiO_4 \qquad (B)$$

wherein $M^2$ represents Ni, Co, Al, Zn, V, or Zr, and d, e, and f each represent a number satisfying $0 \le d \le 1$, $0 \le e \le 1$, $0 \le f < 1$, $2d+2e+(\text{valence of } M^2) \times f = 2$, and $d+e \ne 0$; and $$NaFe_gMn_hQ_iPO_4 \qquad (C)$$

wherein Q represents Mg, Ca, Co, Sr, Y, Zr, Mo, Ba, Pb, Bi, La, Ce, Nd, or Gd, and g, h, and i each represent a number satisfying $0 \le g \le 1$, $0 \le h \le 1$, $0 \le i \le 1$, $2g+2h+(\text{valence of } Q) \times i = 2$, and $g+h \ne 0$.

All these compounds have an olivine type structure and comprise at least iron or manganese. In the case where the compound represented by the formula (A) or the formula (B) is used, the positive electrode active substance for a lithium ion cell is obtained, and in the case where the compound represented by the formula (C) is used, the positive electrode active substance for a sodium ion cell is obtained.

The compound represented by the formula (A) is a so-called olivine type lithium transition metal phosphate compound which comprises at least iron (Fe) and manganese (Mn) as transition metals. In the formula (A), $M^1$ represents Mg, Ca, Sr, Y, Zr, Mo, Ba, Pb, Bi, La, Ce, Nd, or Gd and is preferably Mg, Zr, Mo, or Co. a satisfies $0 \le a \le 1$, preferably $0.01 \le a \le 0.99$, and more preferably $0.1 \le a \le 0.9$. b satisfies $0 \le b \le 1$, preferably $0.01 \le b \le 0.99$, and more preferably $0.1 \le b \le 0.9$. c satisfies $0 \le c \le 0.2$, preferably $0 \le c \le 0.1$. Moreover, a, b, and c are each a number satisfying $2a+2b+(\text{valence of } M^1) \times c = 2$ and $a+b \ne 0$. Specific examples of the olivine type lithium transition metal phosphate compound represented by the formula (A) include $LiFe_{0.2}Mn_{0.8}PO_4$, $LiFe_{0.9}Mn_{0.1}PO_4$, $LiFe_{0.15}Mn_{0.75}Mg_{0.1}PO_4$, and $LiFe_{0.19}Mn_{0.75}Zr_{0.03}PO_4$, and among the olivine type lithium transition metal phosphate compounds, $LiFe_{0.2}Mn_{0.8}PO_4$ is preferable.

The compound represented by the formula (B) is a so-called olivine type lithium transition metal silicate compound comprising at least iron (Fe) and manganese (Mn) as transition metals. In the formula (B), $M^2$ represents Ni, Co, Al, Zn, V, or Zr and is preferably Co, Al, Zn, V, or Zr. d satisfies $0 \le d \le 1$, preferably $0 \le d \le 1$, and more preferably $0.1 \le d \le 0.6$. e satisfies $0 \le e \le 1$, preferably $0 \le e \le 1$, and more preferably $0.1 \le e \le 0.6$. f satisfies $0 \le f \le 1$, preferably $0 < f < 1$, and more preferably $0.05 \le f \le 0.4$. Moreover, d, e, and f are each a number satisfying $2d+2e+(\text{valence of } M^2) \times f = 2$, and $d+e \ne 0$. Specific examples of the olivine type lithium transition metal silicate compound represented by the formula (B) include $Li_2Fe_{0.45}Mn_{0.45}Co_{0.1}SiO_4$, $Li_2Fe_{0.36}Mn_{0.54}Al_{0.066}SiO_4$, $Li_2Fe_{0.45}Mn_{0.45}Zn_{0.1}SiO_4$, $Li_2Fe_{0.36}Mn_{0.54}V_{0.0066}SiO_4$, and $Li_2Fe_{0.282}Mn_{0.658}Zr_{0.02}SiO_4$, and among the olivine type lithium transition metal silicate compounds, $Li_2Fe_{0.282}Mn_{0.658}Zr_{0.02}SiO_4$ is preferable.

The compound represented by the formula (C) is a so-called olivine type sodium transition metal phosphate compound comprising at least iron (Fe) and manganese (Mn) as transition metals. In the formula (C), Q represents Mg, Ca, Co, Sr, Y, Zr, Mo, Ba, Pb, Bi, La, Ce, Nd, or Gd and is preferably Mg, Zr, Mo, or Co. g satisfies $0 \leq g \leq 1$, preferably $0 \leq g \leq 1$. h satisfies $0 \leq h \leq 1$, preferably $0.5 \leq h \leq 1$. i satisfies $0 \leq i < 1$, preferably $0 \leq i \leq 0.5$, and more preferably $0 \leq i \leq 0.3$. Moreover, g, h, and i are each a number satisfying $0 \leq g \leq 1$, $0 \leq h \leq 1$, $0 \leq i \leq 1$, $2g+2h+(\text{valence of Q}) \times i = 2$, and $g+h \neq 0$. Specific examples of the olivine type sodium transition metal phosphate compound represented by the formula (C) include $NaFe_{0.2}Mn_{0.8}PO_4$, $NaFe_{0.9}Mn_{0.1}PO_4$, $NaFe_{0.15}Mn_{0.7}Mg_{0.15}PO_4$, $NaFe_{0.19}Mn_{0.75}Zr_{0.03}PO_4$, $NaFe_{0.19}Mn_{0.75}Mo_{0.03}PO_4$, and $NaFe_{0.15}Mn_{0.7}Co_{0.15}PO_4$, and among the olivine type sodium transition metal phosphate compounds, $NaFe_{0.2}Mn_{0.8}PO_4$ is preferable.

In the positive electrode active substance for a secondary cell according to the present invention, a water-insoluble electrically conductive carbon material and carbon obtained by carbonizing a water-soluble carbon material (carbon derived from water-soluble carbon material) are supported on the compound represented by the formula (A), (B), or (C). That is, the water-insoluble electrically conductive carbon material and the water-soluble carbon material coexist as carbon sources, so that carbon derived from the one carbon source covers the surface of the compound, and at a site where the carbon does not exist and the surface of the compound is exposed, carbon derived from the other carbon source is supported effectively. Accordingly, the water-insoluble electrically conductive carbon material together with the carbon obtained by carbonizing the water-soluble carbon material is supported firmly over the entire surface of the compound while suppressing the exposure of the surface of the compound effectively, and therefore the adsorption of water in the positive electrode active substance for a secondary cell according to the present invention can be prevented effectively.

The water-insoluble electrically conductive carbon material to be supported on the compound represented by the formula (A), (B), or (C) is a water-insoluble carbon material the solubility of which to 100 g of water at 25° C. is less than 0.4 g expressed in terms of carbon atoms of the water-insoluble electrically conductive carbon material and is a carbon source which itself has electrical conductivity without being subjected to pyrolyzing or the like. Examples of the water-insoluble electrically conductive carbon material include at least one selected from the group consisting of graphite, acetylene black, Ketjen black, channel black, furnace black, lamp black, and thermal black. Among the water-insoluble electrically conductive carbon materials, graphite is preferable from the viewpoint of reducing the amount of adsorbed water. The graphite may be any of artificial graphite (flake, vein, earthy, graphene) and natural graphite.

The BET specific surface area of the water-insoluble electrically conductive carbon material which can be used is preferably 1 to 750 $m^2/g$, more preferably 3 to 500 $m^2/g$ from the viewpoint of reducing the amount of the adsorbed water effectively. In addition, the average particle diameter of the water-insoluble electrically conductive carbon material is preferably 0.5 to 20 μm, more preferably 1.0 to 15 μm from the same viewpoint.

The water-soluble carbon material to be supported as carbon obtained through carbonization together with the water-insoluble electrically conductive carbon material on the compound represented by formula (A), (B), or (C) means a carbon material which dissolves in 100 g of water at 25° C. 0.4 g or more, preferably 1.0 g or more expressed in terms of carbon atoms of the water-soluble carbon material and functions as a carbon source which covers the surface of the compound represented by the formulas (A) to (C). Examples of the water-soluble carbon material include at least one selected from the group consisting of saccharides, polyols, polyethers, and organic acids. More specific examples include: monosaccharides such as glucose, fructose, galactose, and mannose; disaccharides such as maltose, sucrose, and cellobiose; polysaccharides such as starches and dextrins; polyols and polyethers such as ethylene glycol, propylene glycol, diethylene glycol, polyethylene glycol, butane diol, propane diol, polyvinyl alcohol, and glycerin; and organic acids such as citric acid, tartaric acid, and ascorbic acid. Among the water-soluble carbon materials, glucose, fructose, sucrose, and dextrins are preferable, more preferably glucose from the viewpoint of high solubility and dispersibility to solvents for functioning as a carbon material effectively.

With respect to the water-insoluble electrically conductive carbon material and the water-soluble carbon material each in an amount expressed in terms of carbon atoms, the water-insoluble electrically conductive carbon material and the carbonized water-soluble carbon material coexist as the carbon supported on the compound in the positive electrode active substance for a secondary cell according to the present invention. The amount of the water-insoluble electrically conductive carbon material and the water-soluble carbon material expressed in terms of carbon atoms corresponds to the total amount of the supported carbon of the water-insoluble electrically conductive carbon material and the carbon obtained by carbonizing the water-soluble carbon material and is preferably 1.0 to 20.0 mass %, more preferably 2.0 to 17.5 mass %, and still more preferably 3.0 to 15.0 mass % in total in the positive electrode active substance for a secondary cell according to the present invention. Specifically, the amount of the water-insoluble electrically conductive carbon material and the water-soluble carbon material expressed in terms of carbon atoms is preferably 1.0 to 15.0 mass %, more preferably 2.0 to 13.5 mass %, and still more preferably 3.0 to 12.0 mass % in the positive electrode active substance for a secondary cell, wherein the compound is represented by the formula (A) or (C), and preferably 2.0 to 20.0 mass %, more preferably 3.0 to 17.5 mass %, and still more preferably 4.0 to 15.0 mass % in the positive electrode active substance for a secondary cell, wherein the compound is represented by the formula (B).

In addition, the amount of the water-soluble carbon material expressed in terms of carbon atoms, namely the amount of carbon supported for the carbon obtained by carbonizing the water-soluble carbon material, is preferably 0.5 to 17.0 mass %, more preferably 0.5 to 13.5 mass %, and still more preferably 0.5 to 10.0 mass % in the positive electrode active substance for a secondary cell according to the present invention. Specifically, the amount of the water-soluble carbon material expressed in terms of carbon atoms is preferably 0.5 to 10.0 mass %, more preferably 0.5 to 9.0 mass %, and still more preferably 0.5 to 8.0 mass % in the positive electrode active substance for a secondary cell, wherein the compound is represented by the formula (A) or (C), and is preferably 0.75 to 17.0 mass %, more preferably 0.75 to 13.5 mass %, and still more preferably 0.75 to 10.0 mass % in the positive electrode active substance for a secondary cell, wherein the compound is represented by the formula (B).

It is to be noted that the total amount of the water-insoluble electrically conductive carbon material and the water-soluble carbon material which exist in the positive electrode active substance for a secondary cell expressed in terms of carbon atoms can be checked as the total amount of carbon measured using a carbon-sulfur analyzing apparatus. In addition, the amount of the water-soluble carbon material expressed in terms of carbon atoms can be checked by subtracting the amount of the water-insoluble electrically conductive carbon material added from the total amount of the carbon measured using a carbon-sulfur analyzing apparatus.

In the positive electrode active substance for a secondary cell according to the present invention, the water-soluble carbon material is preferably supported as carbon obtained through carbonization on the composite comprising the compound represented by the formula (A), (B), or (C) and the water-insoluble electrically conductive carbon material from the viewpoint of allowing the water-insoluble electrically conductive carbon material and the carbon obtained by carbonizing the water-soluble carbon material to be supported complementing each other on the compound effectively, and specifically, the carbon obtained by carbonizing the water-soluble carbon material is preferably supported on the composite in which the water-insoluble electrically conductive carbon material is supported on the compound.

Specifically, the water-insoluble electrically conductive carbon material is preferably supported on the compound by subjecting the water-insoluble electrically conductive carbon material and the compound obtained though hydrothermal reaction to dry mixing and is more preferably supported on the compound by subjecting the water-insoluble electrically conductive carbon material and the compound to preliminary mixing and then mixing while compressive force and shear force are applied. That is, the composite comprising the compound and the water-insoluble electrically conductive carbon material is preferably a mixture obtained by dry-mixing the water-insoluble electrically conductive carbon material and the compound which is a hydrothermal reaction product. It is to be noted that the compound on which the water-insoluble electrically conductive carbon material is supported by pyrolyzing the water-insoluble electrically conductive carbon material is obtained as the composite comprising the compound and the water-insoluble electrically conductive carbon material. In addition, when the dry mixing is conducted, another water-soluble carbon material may be added supplementarily as necessary separately from the water-soluble carbon material which is added when the wet mixing is conducted, which will be mentioned later, is conducted. The composite obtained in this case comprises the water-soluble carbon material together with the compound and the water-insoluble electrically conductive carbon material.

The water-soluble carbon material to be supported as the carbon obtained through carbonization on the composite comprising the compound and the water-insoluble electrically conductive carbon material is preferably supported on the compound as the carbon obtained through carbonization by subjecting the water-soluble carbon material and the composite to wet mixing and then pyrolyzing from the viewpoint of allowing carbon to be supported further effectively at the site where the water-insoluble electrically conductive carbon material does not exist and the surface of the compound is exposed in the composite. That is, the positive electrode active substance for a secondary cell according to the present invention is preferably a pyrolyzed product of a mixture obtained by wet-mixing the water-soluble carbon material with the composite comprising the compound and the water-insoluble electrically conductive carbon material. By the pyrolysis for carbonizing the water-soluble carbon material, the crystallinity of both the compound and the water-insoluble electrically conductive carbon material which has been lowered due to the dry mixing or the like can be recovered, and therefore the electrical conductivity in the positive electrode active substance to be obtained can be enhanced effectively. It is to be noted that the kind of water-soluble carbon material which is used when the wet mixing is conducted may be the same as or different from the kind of water-soluble carbon material which is used supplementarily as necessary when the dry mixing is conducted.

More specifically, the positive electrode active substance for a secondary cell according to the present invention is preferably obtained by a production method comprising:

a step (I) of subjecting slurry comprising: the lithium compound or the sodium compound; a phosphoric acid compound or a silicic acid compound; and a metal salt comprising at least an iron compound or a manganese compound to hydrothermal reaction, thereby obtaining the compound X;

a step (II) of adding the water-insoluble electrically conductive carbon material to the obtained compound (X) and conducting dry mixing, thereby obtaining the composite Y; and a step (III) of adding the water-soluble carbon material to the obtained composite Y and conducting wet mixing and then pyrolyzing.

The step (I) is a step of subjecting the slurry comprising: the lithium compound or the sodium compound; the phosphoric acid compound or the silicic acid compound; and the metal salt comprising at least the iron compound or the manganese compound to hydrothermal reaction, thereby obtaining the compound X.

Examples of the lithium compound or the sodium compound which can be used include hydroxides (for example, $LiOH.H_2O$, $NaOH$), carbonated products, sulfonated products, and acetylated products. Among them, hydroxides are preferable.

The content of the lithium compound or the silicic acid compound in the slurry is preferably 5 to 50 mass parts, more preferably 7 to 45 mass parts based on 100 mass parts of water. More specifically, in the case where the phosphoric acid compound is used in the step (I), the content of the lithium compound or the sodium compound in the slurry is preferably 5 to 50 mass parts, more preferably 10 to 45 mass parts based on 100 mass parts of water. In the case where the silicic acid compound is used, the content of the silicic acid compound in the slurry is preferably 5 to 40 mass parts, more preferably 7 to 35 mass parts based on 100 mass parts of water.

The step (I) preferably comprises a step (Ia) of mixing the phosphoric acid compound or the silicic acid compound with a mixture $A^1$ comprising the lithium compound or the sodium compound, thereby obtaining a mixture $A^2$, and a step (Ib) of subjecting slurry X obtained by adding the metal salt comprising at least the iron compound or the manganese compound to the obtained mixture $A^2$ and mixing the resultant mixture to hydrothermal reaction, thereby obtaining the compound X from the viewpoint of enhancing the dispersibility of each component contained in the slurry and making the particle of the positive electrode active substance to be obtained fine, thereby improving the cell physical properties.

It is preferable to stir the mixture A in advance before mixing the phosphoric acid compound or the silicic acid compound with the mixture $A^1$ in the step (I) or (Ia). The time for stirring the mixture $A^1$ is preferably 1 to 15 minutes, more preferably 3 to 10 minutes. In addition, the temperature of the mixture $A^1$ is preferably 20 to 90° C., more preferably 20 to 70° C.

Examples of the phosphoric acid compound for use in the step (I) or (Ia) include orthophosphoric acid ($H_3PO_4$, phosphoric acid), metaphosphoric acid, pyrophosphoric acid, triphosphoric acid, tetraphosphoric acid, ammonium phosphate, and ammonium hydrogenphosphate. Among the phosphoric acid compounds, it is preferable to use phosphoric acid, and it is preferable to use phosphoric acid as an aqueous solution having a concentration of 70 to 90 mass %. In the step (I) or (Ia), when phosphoric acid is mixed with the mixture $A^1$, it is preferable to drop phosphoric acid while stirring the mixture $A^1$. When phosphoric acid is added dropwise to the mixture $A^1$ little by little, the reaction progresses in the mixture $A^1$ satisfactorily to produce a precursor of the compound represented by the formulas (A) to (C) while the precursor of the compound is uniformly dispersed in the slurry, and even unnecessary aggregation of the precursor of the compound can be suppressed effectively.

The speed of dropping phosphoric acid into the mixture $A^1$ is preferably 15 to 50 mL/min, more preferably 20 to 45 mL/min, and still more preferably 28 to 40 mL/min. In addition, the time for stirring the mixture $A^1$ while dropping phosphoric acid is preferably 0.5 to 24 hours, more preferably 3 to 12 hours. Further, the speed of stirring the mixture $A^1$ while dropping phosphoric acid is preferably 200 to 700 rpm, more preferably 250 to 600 rpm, and still more preferably 300 to 500 rpm.

It is to be noted that when the mixture $A^1$ is stirred, it is preferable to cool the mixture $A^1$ to a temperature equal to or lower than the boiling point of the mixture $A^1$. Specifically, it is preferable to cool the mixture $A^1$ to a temperature of 80° C. or lower, more preferably to a temperature of 20 to 60° C.

The silicic acid compound for use in the step (I) or (Ia) is not particularly limited as long as the silicic acid compound is a silica compound having reactivity, and examples include amorphous silica and $Na_4SiO_4$ (for example, $Na_4SiO_4 \cdot H_2O$).

It is preferable that the mixture $A^2$ after mixing the phosphoric acid compound or the silicic acid compound comprise 2.0 to 4.0 mol of lithium or sodium, more preferably 2.0 to 3.1 mol based on 1 mol of phosphoric acid or silicic acid, and the lithium compound or the sodium compound, and the phosphoric acid compound or the silicic acid compound may be used so that the amounts thereof may be as such. More specifically, in the case where the phosphoric acid compound is used in the step (I), it is preferable that the mixture $A^2$ after mixing the phosphoric acid compound comprise 2.7 to 3.3 mol of lithium or sodium, more preferably 2.8 to 3.1 mol based on 1 mol of phosphoric acid, and in the case where the silicic acid compound is used in the step (I), it is preferable that the mixture $A^2$ after mixing the silicic acid compound comprise 2.0 to 4.0 mol of lithium, more preferably 2.0 to 3.0 mol based on 1 mol of silicic acid.

By conducting a nitrogen purge to the mixture $A^2$ after mixing the phosphoric acid compound or the silicic acid compound, the reaction in the mixture $A^2$ is completed to produce a precursor of the compound represented by the formulas (A) to (C) in the mixture $A^2$. When the nitrogen purge is conducted, the reaction can be made to proceed in a state where the dissolved oxygen concentration in the mixture $A^2$ is reduced, and moreover, the dissolved oxygen concentration in the mixture which comprises the obtained precursor of the compound is also reduced effectively, so that oxidation of the iron compound, the manganese compounds, and the like to be added in the next step can be suppressed. In the mixture $A^2$, the precursor of the compound represented by the formulas (A) to (C) exists as a fine dispersed particle. The precursor of the compound is obtained, for example, as a trilithium phosphate ($Li_3PO_4$) in the case of the compound represented by the formula (A).

The pressure in conducting the nitrogen purge is preferably 0.1 to 0.2 MPa, more preferably 0.1 to 0.15 MPa. In addition, the temperature of the mixture $A^2$ after mixing the phosphoric acid compound or the silicic acid compound is preferably 20 to 80° C., more preferably 20 to 60° C. For example, in the case of the compound represented by the formula (A), the reaction time is preferably 5 to 60 minutes, more preferably 15 to 45 minutes.

In addition, when the nitrogen purge is conducted, it is preferable to stir the mixture $A^2$ after mixing the phosphoric acid compound or the silicic acid compound from the viewpoint of allowing the reaction to progress satisfactorily. The stirring speed in this case is preferably 200 to 700 rpm, more preferably 250 to 600 rpm.

In addition, it is preferable to make the dissolved oxygen concentration in the mixture $A^2$ after mixing the phosphoric acid compound or the silicic acid compound 0.5 mg/L or lower, more preferably 0.2 mg/L or lower from the viewpoint of suppressing the oxidation at the surface of the dispersed particle of the precursor of the compound more effectively and making the dispersed particle fine.

In the step (I) or (Ib), the slurry comprising: the obtained precursor of the compound; and the metal salt comprising at least the iron compound or the manganese compound is subsequently subjected to hydrothermal reaction, thereby obtaining the compound X. It is preferable that the obtained precursor of the compound be used as it is as the mixture and the metal salt comprising at least the iron compound or the manganese compound be added to the precursor of the compound to prepare the slurry X. Thereby, the compound represented by the formulas (A) to (C) can be obtained, and the particle of the compound can be made extremely fine while the steps are simplified, so that an extremely useful positive electrode active substance for a secondary cell can be obtained.

Examples of the iron compound which can be used include iron acetate, iron nitrate, and iron sulfate. These iron compounds may be used singly or in a combination of two or more. Among the iron compounds, iron sulfate is preferable from the viewpoint of enhancing cell properties.

Examples of the manganese compound which can be used include manganese acetate, manganese nitrate, and manganese sulfate. These manganese compounds may be used singly or in a combination of two or more. Among the manganese compounds, manganese sulfate is preferable from the viewpoint of enhancing the cell properties.

In the case where both the iron compound and the manganese compound are used as the metal salt, the molar ratio of the iron compound used and the manganese compound used (iron compound:manganese compound) is preferably 99:1 to 1:99, more preferably 90:10 to 10:90. In addition, the total amount of the iron compound and the manganese compound added is preferably 0.99 to 1.01 mol, more preferably 0.995 to 1.005 mol based on 1 mol of $Li_3PO_4$ contained in the slurry X.

Further, a metal (M, N, or Q) salt other than the iron compound and the manganese compound may be used as the metal salt as necessary. In the metal (M, N, or Q) salt, M, N, and Q have the same meaning as M, N, and Q in the formulas (A) to (C), and as the metal salt, sulfates, halogen compounds, organic acid salts, hydrates thereof, and the like can be used. These metal salts may be used singly, or two or more of these metal salts may be used. Among the metal salts, sulfates are more preferably used from the viewpoint of enhancing the cell properties.

In the case where these metal (M, N, or Q) salts are used, the total amount of the iron compound, manganese compound, and metal salts (M, N, or Q) added is preferably 0.99 to 1.01 mol, more preferably 0.995 to 1.005 mol based on 1 mol of phosphoric acid or silicic acid in the mixture obtained through the step (I).

The amount of water for use in conducting the hydrothermal reaction is preferably 10 to 50 mol, more preferably 12.5 to 45 mol based on 1 mol of phosphoric acid ion or silicic acid ion contained in the slurry X from the viewpoint of solubility of the metal salt to be used, easiness of stirring, efficiency of synthesis, and the like. More specifically, in the case where the ion contained in the slurry X is a phosphate ion, the amount of water for use in conducting the hydrothermal reaction is preferably 10 to 30 mol, more preferably 12.5 to 25 mol. In the case where the ion contained in the slurry X is a silicate ion, the amount of water for use in conducting the hydrothermal reaction is preferably 10 to 50 mol, more preferably 12.5 to 45 mol.

In the step (I) or (Ib), the order of addition of the iron compound, the manganese compound, and the metal (M, N, or Q) salt is not particularly limited. In addition, an antioxidant may be added as necessary with these metal salts. As the antioxidant, sodium sulfite ($Na_2SO_3$), sodium hydrosulfite ($Na_2S_2O_4$), ammonia water, and the like can be used. The amount of the antioxidant added is preferably 0.01 to 1 mol, more preferably 0.03 to 0.5 mol based on 1 mol of the total amount of the iron compound, manganese compound, and the metal (M, N, or Q) salt which is added as necessary from the viewpoint of preventing suppression of the production of the compound represented by the formulas (A) to (C) caused by excessive addition of the antioxidant.

The content of the precursor of the compound in the slurry X obtained by adding the iron compound, the manganese compound, and the metal (M, N, or Q) salt or the antioxidant which is used as necessary is preferably 10 to 50 mass %, more preferably 15 to 45 mass %, and more preferably 20 to 40 mass %.

The temperature during the hydrothermal reaction in the step (I) or (Ib) may be 100° C. or higher, more preferably 130 to 180° C. It is preferable that the hydrothermal reaction be conducted in a pressure resistant container. In the case where the reaction is conducted at 130 to 180° C., it is preferable that the pressure during the reaction be 0.3 to 0.9 MPa, and in the case where the reaction is conducted at 140 to 160° C., it is preferable that the pressure during the reaction be 0.3 to 0.6 MPa. It is preferable that the time for the hydrothermal reaction be 0.1 to 48 hours, more preferably 0.2 to 24 hours.

The obtained compound X is the compound represented by the formulas (A) to (C), and the compound X can be isolated through washing with water after filtration, and drying thereafter. It is to be noted that as dry means, freeze dry and vacuum dry are used.

The BET specific surface area of the compound X obtained is preferably 5 to 40 $m^2/g$, more preferably 5 to 20 $m^2/g$ from the viewpoint of allowing the carbon which coexists with the compound X to be supported efficiently and reducing the amount of the adsorbed water effectively. When the BET specific surface area of the compound X is less than 5 $m^2/g$, there is a risk that the primary particle of the positive electrode active substance for a secondary cell becomes too large and the cell properties are lowered. When the BET specific surface area exceeds 40 $m^2/g$, there is a risk that the amount of the adsorbed water in the positive electrode active substance for a secondary cell increases to give an influence on the cell properties.

The step (II) is a step of adding the water-insoluble electrically conductive carbon material to the compound X obtained in the step (I) and then conducting dry mixing, thereby obtaining the composite Y. The water-soluble carbon material may further be added supplementarily in addition to the water-insoluble electrically conductive carbon material, and in this case, the order of addition of these materials is not particularly limited. The amount of the water-insoluble electrically conductive carbon material added is, for example, preferably 0.5 to 24.2 mass parts, more preferably 1.5 to 20.5 mass parts, and still more preferably 2.6 to 17.0 mass parts based on 100 mass parts of the compound X. Specifically, the amount of the water-insoluble electrically conductive carbon material added is preferably 0.5 to 17.0 mass parts, more preferably 1.5 to 14.9 mass parts, and still more preferably 2.6 to 13.0 mass parts in the positive electrode active substance for a secondary cell, wherein the compound is represented by the formula (A) or (C), and preferably 1.3 to 23.8 mass parts, more preferably 2.3 to 20.1 mass parts, and still more preferably 3.4 to 16.6 mass parts in the positive electrode active substance for a secondary cell, wherein the compound is represented by the formula (B).

In addition, in the case where the water-insoluble electrically conductive carbon material and the water-soluble carbon material are used together in the step (II), the mass ratio of the amount of the water-insoluble electrically conductive carbon material and the amount of the water-soluble carbon material added and expressed in terms of carbon atoms (water-insoluble electrically conductive carbon material:water-soluble carbon material) is preferably 100:2 to 3:100, more preferably 100:10 to 10:100.

The dry mixing in the step (II) is preferably mixing with an ordinary ball mill, more preferably mixing with a planetary ball mill capable of rotating and revolving. Further, the composite Y is more preferably mixed while the compressive force and the shear force are applied to prepare a composite Y' from the viewpoint of dispersing the water-insoluble electrically conductive carbon material and the water-soluble carbon material used together as necessary densely and uniformly on the surface of the compound represented by the formulas (A) to (C), thereby allowing the carbon materials to be supported effectively as the carbon obtained through carbonization. It is preferable to conduct the mixing treatment which is conducted while the compressive force and the shear force are applied in an airtight container provided with an impeller. The circumferential speed of the impeller is preferably 25 to 40 m/s, more preferably 27 to 40 m/s from the viewpoint of enhancing the tap density of the positive electrode active substance to be obtained and reducing the BET specific surface area to reduce the amount of the adsorbed water effectively. In addition, the mixing time is preferably 5 to 90 minutes, more preferably 10 to 80 minutes.

It is to be noted that the circumferential speed of the impeller means the speed of the outermost edge portion of a rotary type stirring blade (impeller) and can be expressed by the following formula (1), and the time for conducting the mixing treatment while applying the compressive force and the shear force becomes longer as the circumferential speed of the impeller becomes slower and therefore can be varied depending on the circumferential speed of the impeller.

Circumferential speed of impeller (m/s)=Radius of impeller (m)×2×π×number of revolution (rpm)÷60    (1)

The treatment time and/or the circumferential speed of the impeller in conducting the mixing treatment while applying the compressive force and the shear force in the step (II) need to be adjusted appropriately according to the amount of the composite Y which is put into the container. By operating the container, the treatment of mixing the mixture can be conducted while the compressive force and the shear force are applied to the mixture between the impeller and the inner wall of the container, so that the water-insoluble electrically conductive carbon material and the water-soluble carbon material which is used supplementarily as necessary are densely and uniformly dispersed on the surface of the compound represented by the formulas (A) to (C), and the positive electrode active substance for a secondary cell, in which the amount of the adsorbed water can be reduced effectively by the water-insoluble electrically conductive carbon material together with the water-soluble carbon material which is to be added in the step (III), as will be mentioned later, can be obtained.

For example, in the case where the mixing treatment is conducted in an airtight container provided with an impeller rotating at a circumferential speed of 25 to 40 m/s for 6 to 90 minutes, the amount of the composite Y put into the container is preferably 0.1 to 0.7 g, more preferably 0.15 to 0.4 g per 1 cm$^3$ of the effective container (in the container provided with the impeller, a container corresponding to a site where the composite Y can be accommodated).

Examples of an apparatus provided with the airtight container in which the mixing treatment can be conducted easily while the compressive force and the shear force are applied include a high-speed shearing mill and a blade type kneader, and specifically, for example, a particle composing machine, Nobilta (manufactured by Hosokawa Micron Corporation), can be used suitably.

With respect to the mixing treatment conditions, the treatment temperature is preferably 5 to 80° C., more preferably 10 to 50° C. The treatment atmosphere is not particularly limited; however, the treatment is preferably conducted under an inert gas atmosphere or a reducing gas atmosphere.

The step (III) is a step of adding the water-soluble carbon material to a product obtained in the step (I) and conducting wet mixing and then pyrolyzing. Through the step (III), the exposure of the surface of the compound X represented by the formulas (A) to (C) is suppressed effectively, and both the water-insoluble electrically conductive carbon material and the carbon obtained by carbonizing the water-soluble carbon material can be supported on the compound X firmly.

The amount of the water-soluble carbon material added in the step (III) is preferably 1.0 to 55.0 mass parts, more preferably 1.0 to 40.0 mass parts, and still more preferably 1.0 to 30.0 mass parts based on 100 mass parts of the composite Y (or composite Y' in the case where the mixing treatment which is conducted while the compressive force and the shear force are applied is further conducted in the step (III), the same applies hereinafter) from the viewpoint of allowing the carbon obtained by carbonizing the water-soluble carbon material to be supported effectively on the surface of the compound X where the water-insoluble electrically conductive carbon material does not exist and keeping a sufficient charge and discharge capacity.

In the step (III), it is preferable to add water with the water-soluble carbon material from the viewpoint of allowing the carbon obtained by carbonizing the water-soluble carbon material to be supported on the surface of the compound further satisfactorily. The amount of water added is preferably 30 to 300 mass parts, more preferably 50 to 250 mass parts, and still more preferably 75 to 200 mass parts based on 100 mass parts of the composite Y (or composite Y'). The water dissolves the water-soluble carbon material added supplementarily and supported on the composite Y (or composite Y'), and allows the water-soluble carbon material to exhibit the same action as the action of the water-soluble carbon material added in the step (III) in the case where the water-soluble carbon material is added supplementarily in the step (II).

The wet mixing means in the step (III) is not particularly limited, and the wet mixing can be conducted by an ordinary method. The temperature during the mixing after adding the water-soluble carbon material to the composite Y (or composite Y') is preferably 5 to 80° C., more preferably 7 to 70° C. It is preferable to dry the obtained mixture before pyrolyzing. Examples of the dry means include spray dry, vacuum dry, and freeze dry.

In the step (III), the mixture obtained through the wet mixing is pyrolyzed. It is preferable to conduct pyrolysis in a reducing atmosphere or an inert atmosphere. The pyrolysis temperature is preferably 500 to 800° C., more preferably 600 to 770° C., and still more preferably 650 to 750° C. from the viewpoint of enhancing the crystallinity of the water-insoluble electrically conductive carbon material to improve the electrical conductivity and the viewpoint of carbonizing the water-soluble carbon material more effectively. In addition, the pyrolysis time is preferably 10 minutes to 3 hours, more preferably 30 minutes to 1.5 hours.

In the positive electrode active substance for a secondary cell according to the present invention, both the water-insoluble electrically conductive carbon material and the carbon obtained by carbonizing the water-soluble carbon material are supported on the compound and act synergistically, so that the amount of the adsorbed water in the positive electrode active substance for a secondary cell can be reduced effectively. Specifically, in the positive electrode active substance for a secondary cell, wherein the compound is represented by the formula (A) or (C), the amount of the absorbed water in the positive electrode active substance for a secondary cell according to the present invention is preferably 850 ppm or less, more preferably 700 ppm or less, and in the positive electrode active substance for a secondary cell, wherein the compound is represented by the formula (B), the amount is preferably 2,900 ppm or less, more preferably 2,500 ppm or less. It is to be noted that the amount of the adsorbed water is a value measured as the amount of water volatilized between a start point and an end point, wherein when water is adsorbed at a temperature of 20° C. and a relative humidity of 50% until an equilibrium is achieved, the temperature is then raised to 150° C. where the temperature is kept for 20 minutes, and the temperature is then further raised to 250° C. where the temperature is kept for 20 minutes, the start point is defined as the time when raising the temperature is restarted from 150° C., and the end point is defined as the time when the state of the constant temperature at 250° C. is completed. The amount of the adsorbed water in the positive electrode active substance for a secondary cell and the amount of the water volatilized between the start point and the end point are regarded as the same amount, and the measured value of the amount of the water volatilized is defined as the amount of the adsorbed water in the positive electrode active substance for a secondary cell.

As described above, the positive electrode active substance for a secondary cell according to the present invention is hard to adsorb water, and therefore the amount of the adsorbed water can be reduced effectively without a strong drying condition as a production environment and excellent cell properties can be exhibited stably even under the various use environments in both the lithium ion secondary cell and the sodium ion secondary cell to be obtained.

It is to be noted that the amount of the water volatilized between the start point and the end point, wherein when water is adsorbed at a temperature of 20° C. and a relative humidity of 50% until an equilibrium is achieved, the temperature is then raised to 150° C. where the temperature is kept for 20 minutes, and the temperature is then further raised to 250° C. where the temperature is kept for 20 minutes, the start point is defined as the time when raising the temperature is restarted from 150° C., and the end point is defined as the time when the state of the constant temperature at 250° C. is completed, can be measured, for example, using a Karl Fischer moisture titrator.

In addition, the tap density of the positive electrode active substance for a secondary cell according to the present invention is preferably 0.5 to 1.6 g/cm$^3$, more preferably 0.8 to 1.6 g/cm$^3$ from the viewpoint of reducing the amount of the adsorbed water effectively.

Further, the BET specific surface area of the positive electrode active substance for a secondary cell according to the present invention is preferably 5 to 21 m$^2$/g, more preferably 7 to 20 m$^2$/g from the viewpoint of reducing the amount of the adsorbed water effectively.

The secondary cell to which a positive electrode for a secondary cell, the positive electrode comprising the positive electrode active substance for a secondary cell according to the present invention, is applicable is not particularly limited as long as the secondary cell comprises a positive electrode, a negative electrode, an electrolytic solution, and a separator as essential constituents.

The negative electrode here is not particularly limited by the material constitution thereof as long as the negative electrode can occlude lithium ions or sodium ions during charge and release lithium ions or sodium ions during discharge, and negative electrodes having publicly known material constitution can be used. Examples of the material include lithium metal, sodium metal, and a carbon material such as graphite or amorphous carbon. It is preferable to use an electrode, or a carbon material in particular, which is formed from an intercalation material that can electrochemically occlude-release lithium ions or sodium ions.

The electrolytic solution is obtained by dissolving a supporting electrolyte in an organic solvent. The organic solvent is not particularly limited as long as the organic solvent is usually used in an electrolytic solution for a lithium ion secondary cell or a sodium ion secondary cell, and for example, carbonates, halogenated hydrocarbons, ethers, ketones, nitriles, lactones, and oxolane compounds can be used.

The kind of the supporting electrolyte is not particularly limited; however, in the case of lithium ion secondary cells, at least one of inorganic salts selected from the group consisting of $LiPF_5$, $LiBF_4$, $LiClO_4$, and $LiAsF_6$ and derivatives of the inorganic salts; and organic salts selected from the group consisting of $LiSO_3CF_3$, $LiC(SO_3CF_3)_2$, $LiN(SO_3CF_3)_2$, $LiN(SO_2C_2F_5)_2$, and $LiN(SO_2CF_3)(SO_2C_4F_9)$ and derivatives of the organic salts is preferable. In addition, in the case of sodium ion secondary cells, at least one of inorganic salts selected from the group consisting of $NaPF_6$, $NaBF_4$, $NaClO_4$, and $NaAsF_6$ and derivatives of the inorganic salts; and organic salts selected from the group consisting of $NaSO_3CF_3$, $NaC(SO_3CF_3)_2$, $NaN(SO_3CF_3)_2$, $NaN(SO_2C_2F_5)_2$, and $NaN(SO_2CF_3)(SO_2C_4F_9)$ and derivatives of the organic salts is preferable.

The separator plays a roll of electrically insulating the positive electrode and the negative electrode and holding the electrolytic solution. For example, a porous synthetic resin membrane, a porous membrane of a polyolefin-based polymer (polyethylene, polypropylene) in particular, may be used.

EXAMPLES

Hereinafter, the present invention will be described specifically based on Examples; however, the present invention is not limited to the Examples.

Example 1-1

Slurry was obtained by mixing 4.9 Kg of $LiOH.H_2O$ and 11.7 Kg of water. Subsequently, 5.09 Kg of a 70% phosphoric acid aqueous solution was added dropwise to the obtained slurry at 35 mL/min while the obtained slurry was stirred at a speed of 400 rpm for 30 minutes, during which the temperature was kept at 25° C., to obtain a mixture $A^1$. The mixed slurry solution had a pH of 10.0 and comprised 0.33 mol of phosphoric acid based on 1 mol of lithium hydroxide.

Subsequently, the obtained mixture $A^1$ was purged with nitrogen while the obtained mixture $A^1$ was stirred at a speed of 400 rpm for 30 minutes to complete the reaction in the mixture $A^1$ (dissolved oxygen concentration of 0.5 mg/L). Subsequently, 1.63 kg of $FeSO_4.7H_2O$ and 5.60 kg of $MnSO_4.H_2O$ were added to 21.7 kg of the mixture $A^1$, 0.0468 kg of $Na_2SO_3$ was further added, and the resultant mixture was stirred and mixed at a speed of 400 rpm to obtain a mixture $A^2$. In this case, the molar ratio of $FeSO_4.7H_2O$ added and $MnSO_4.H_2O$ added ($FeSO_4.7H_2O$: $MnSO_4.H_2O$) was 20:80.

Subsequently, the mixture $A^2$ was put into a synthesis container installed in a steam heating type autoclave. After the mixture was put into the synthesis container, the mixture was heated while stirring at 170° C. for 1 hour using saturated steam obtained by heating water (dissolved oxygen concentration of less than 0.5 mg/L) with a diaphragm separation apparatus. The pressure in the autoclave was 0.8 MPa. A produced crystal was filtered and then washed with water. The washed crystal was subjected to vacuum dry under conditions of 60° C. and 1 Torr to obtain an compound $X^1$ (powder, chemical composition represented by formula (A): $LiFe_{0.2}Mn_{0.8}PO_4$).

The obtained compound $X^1$ in an amount of 100 g was taken out and was then subjected to dry mixing with 4 g of graphite (high-purity graphite powder, manufactured by Nippon Graphite Industries, Co., Ltd., BET specific surface area of 5 m$^2$/g, average particle diameter of 6.1 μm, corresponding to 3.8 mass % expressed in terms of carbon atoms in active substance) using a ball mill. Mixing treatment was conducted to an obtained composite $Y^1$ using Nobilta (manufactured by Hosokawa Micron Corporation, NOB130) at 40 m/s (6,000 rpm) for 5 minutes to obtain a composite $Y^{1'}$ (powder).

The obtained composite $Y^{1'}$ in an amount of 10 g was taken out, 0.25 g (corresponding to 1.0 mass % expressed in terms of carbon atoms in active substance) of glucose and 10 mL of water were then added thereto, and the resultant mixture was mixed, then dried at 80° C. for 12 hours, and then pyrolyzed at 700° C. for 11 hours in a reducing atmosphere to obtain a positive electrode active substance ($LiFe_{0.2}Mn_{0.8}PO_4$, amount of carbon=4.8 mass %) for a lithium ion secondary cell, wherein the graphite and carbon derived from glucose were supported on the compound $X^1$.

Example 1-2

A positive electrode active substance ($LiFe_{0.2}Mn_{0.8}PO_4$, amount of carbon=5.8 mass %) for a lithium ion secondary cell was obtained in the same manner as in Example 1-1 except that the amount of glucose added to the composite $Y^{2'}$ was changed to 0.5 g (corresponding to 2.0 mass % expressed in terms of carbon atoms in active substance).

Example 1-3

A positive electrode active substance ($LiFe_{0.2}Mn_{0.8}PO_4$, amount of carbon=6.7 mass %) for a lithium ion secondary cell was obtained in the same manner as in Example 1-1 except that the amount of glucose added to the composite $Y^{1'}$ was changed to 0.75 g (corresponding to 2.9 mass % expressed in terms of carbon atoms in active substance).

Example 1-4

A positive electrode active substance ($LiFe_{0.2}Mn_{0.8}PO_4$, amount of carbon=8.6 mass %) for a lithium ion secondary cell was obtained in the same manner as in Example 1-1 except that the amount of glucose added to the composite $Y^{1'}$ was changed to 1.25 g (corresponding to 4.8 mass % expressed in terms of carbon atoms in active substance).

Example 1-5

A compound $X^2$ (powder, chemical composition represented by formula (A): $LiFe_{0.9}Mn_{0.1}PO_4$) was obtained in the same manner as in Example 1-1 except that the amount of $FeSO_4.7H_2O$ was changed to 7.34 kg, and the amount of $MnSO_4.H_2O$ was changed to 0.7 kg, and then 4 g of the graphite (corresponding to 3.8 mass % expressed in terms of carbon atoms in active substance) was mixed thereto to obtain a composite $Y^2$ and a composite $Y^{2'}$ in the same manner as in Example 1-1. Subsequently, 0.25 g (corresponding to 1.0 mass % expressed in terms of carbon atoms in active substance) glucose was added thereto to obtain a positive electrode active substance ($LiFe_{0.9}Mn_{0.1}PO_4$, amount of carbon=4.8 mass %) for a lithium ion secondary cell, wherein the graphite and carbon derived from glucose were supported.

Comparative Example 1-1

A positive electrode active substance ($LiFe_{0.9}Mn_{0.1}PO_4$, amount of carbon=3.8 mass %) for a lithium ion secondary cell was obtained in the same manner as in Example 1-5 except that glucose was not added to the composite $Y^{2'}$.

Example 2-1

Slurry was obtained by mixing 3.75 L of ultrapure water with 0.428 kg of $LiOH.H_2O$ and 1.40 kg of $Na_4SiO_4.nH_2O$. To the slurry, 0.39 kg of $FeSO_4.7H_2O$, 0.79 kg of $MnSO_4.5H_2O$, and 0.053 kg of $Zr(SO_4)_2.4H_2O$ were added, and the resultant mixture was mixed. Subsequently, an obtained mixed solution was put into an autoclave to conduct hydrothermal reaction at 150° C. for 12 hours. The pressure in the autoclave was 0.4 MPa. A produced crystal was filtered and then washed with 12 mass parts of water based on 1 mass part of the crystal. The washed crystal was subjected to freeze dry at −50° C. for 12 hours to obtain an compound $X^3$ (powder, chemical composition represented by formula (B): $Li_2Fe_{0.28}Mn_{0.66}Zr_{0.03}SiO_4$).

The obtained compound $X^3$ in an amount of 213.9 g was taken out and was then subjected to dry mixing with 16.1 g (corresponding to 7.0 mass % expressed in terms of carbon atoms in active substance) of the graphite using the ball mill. Mixing treatment was conducted to an obtained composite $Y^3$ using Nobilta (manufactured by Hosokawa Micron Corporation, NOB130) at 40 m/s (6,000 rpm) for 5 minutes to obtain a composite $Y^{3'}$ (powder). The obtained composite $Y^{3'}$ in an amount of 5 g was taken out, 0.125 g (corresponding to 1.0 mass % expressed in terms of carbon atoms in active substance) of glucose and 10 ml of water were then added thereto, and the resultant mixture was mixed, then dried at 80° C. for 12 hours, and then pyrolyzed at 650° C. for 1 hour in a reducing atmosphere to obtain a positive electrode active substance ($Li_2Fe_{0.28}Mn_{0.66}Zr_{0.03}SiO_4$, amount of carbon=8.0 mass %) for a lithium ion secondary cell, wherein the graphite and the carbon derived from glucose were supported on the compound $X^3$.

Example 2-2

A positive electrode active substance ($Li_2Fe_{0.28}Mn_{0.66}Zr_{0.03}SiO_4$, amount of carbon=9.0 mass %) for a lithium ion secondary cell was obtained in the same manner as in Example 2-1 except that the amount of glucose added to the composite $Y^{3'}$ was changed to 0.25 g (corresponding to 2.0 mass % expressed in terms of carbon atoms in active substance).

Example 2-3

A positive electrode active substance ($Li_2Fe_{0.28}Mn_{0.66}Zr_{0.03}SiO_4$, amount of carbon=9.9 mass %) for a lithium ion secondary cell was obtained in the same manner as in Example 2-1 except that the amount of glucose added to the composite $Y^{3'}$ was changed to 0.375 g (corresponding to 2.9 mass % expressed in terms of carbon atoms in active substance).

Example 2-4

A positive electrode active substance ($Li_2Fe_{0.28}Mn_{0.66}Zr_{0.03}SiO_4$, amount of carbon=13.8 mass %) for a lithium ion secondary cell was obtained in the same manner as in Example 2-1 except that the amount of glucose added to the composite $Y^{3'}$ was changed to 0.875 g (corresponding to 6.8 mass % expressed in terms of carbon atoms in active substance).

Comparative Example 2-1

A positive electrode active substance ($Li_2Fe_{0.28}Mn_{0.66}Zr_{0.03}SiO_4$, amount of carbon=7.0 mass %) for a lithium ion secondary cell was obtained in the same manner as in Example 2-1 except that glucose was not added to the composite $Y^{3'}$.

Example 3-1

Solution was obtained by mixing 0.60 kg of NaOH and 9.0 L of water. Subsequently, 0.577 kg of the 85% phosphoric acid aqueous solution was added dropwise to the obtained solution at 35 mL/min while the obtained solution was stirred for 5 minutes, during which the temperature was kept at 25° C., and subsequently, the resultant mixture was stirred at a speed of 400 rpm for 12 hours to obtain slurry comprising a mixture $A^4$. The slurry comprised 3.00 mol of sodium based on 1 mol of phosphorus. The nitrogen gas purge was conducted to the obtained slurry to adjust the dissolved oxygen concentration to 0.5 mg/L, 0.139 kg of $FeSO_4 \cdot 7H_2O$, 0.964 kg of $MnSO_4 \cdot 5H_2O$, and 0.124 kg of $MgSO_4 \cdot 7H_2O$ were then added to the slurry. Subsequently, the obtained mixed solution was put into the autoclave purged with a nitrogen gas to conduct hydrothermal reaction at 200° C. for 3 hours. The pressure in the autoclave was 1.4 MPa. A produced crystal was filtered and then washed with 12 mass parts of water based on 1 mass part of the crystal. The washed crystal was subjected to freeze dry at −50° C. for 12 hours to obtain an compound $X^4$ (powder, chemical composition represented by formula (C): $NaFe_{0.1}Mn_{0.8}Mg_{0.1}PO_4$).

The obtained compound $X^4$ in an amount of 153.6 g was taken out and was then subjected to dry mixing with 6.4 g (corresponding to 4 mass % expressed in terms of carbon atoms in active substance) of the graphite using the ball mill. Mixing treatment was conducted to the composite $Y^4$ using Nobilta (manufactured by Hosokawa Micron Corporation, NOB130) at 40 m/s (6,000 rpm) for 5 minutes to obtain a composite $Y^{4'}$ (powder). The obtained composite $Y^{4'}$ in an amount of 5 g was taken out, 0.125 g (corresponding to 1.0 mass % expressed in terms of carbon atoms in active substance) of glucose and 10 mL of water were then added thereto, and the resultant mixture was mixed, then dried at 80° C. for 12 hours, and then pyrolyzed at 700° C. for 1 hour in a reducing atmosphere to obtain a positive electrode active substance ($NaFe_{0.1}Mn_{0.8}Mg_{0.1}PO_4$, amount of carbon=5.0 mass %) for a sodium ion secondary cell, wherein the graphite and the carbon derived from glucose were supported on the compound $X^4$.

Example 3-2

A positive electrode active substance ($NaFe_{0.1}Mn_{0.8}Mg_{0.1}PO_4$, amount of carbon=6.0 mass %) for a sodium ion secondary cell was obtained in the same manner as in Example 3-1 except that the amount of glucose added to the composite $Y^{4'}$ was changed to 0.25 g (corresponding to 2.0 mass % expressed in terms of carbon atoms in active substance).

Example 3-3

A positive electrode active substance ($NaFe_{0.1}Mn_{0.8}Mg_{0.1}PO_4$, amount of carbon=6.9 mass %) for a sodium ion secondary cell was obtained in the same manner as in Example 3-1 except that the amount of glucose added to the composite $Y^{4'}$ was changed to 0.375 g (corresponding to 2.9 mass % expressed in terms of carbon atoms in active substance).

Example 3-4

A positive electrode active substance ($NaFe_{0.1}Mn_{0.8}Mg_{0.1}PO_4$, amount of carbon=10.8 mass %) for a sodium ion secondary cell was obtained in the same manner as in Example 3-1 except that the amount of glucose added to the composite $Y^{4'}$ was changed to 0.92 g (corresponding to 6.8 mass % expressed in terms of carbon atoms in active substance).

Comparative Example 3-1

A positive electrode active substance ($NaFe_{0.1}Mn_{0.8}Mg_{0.1}PO_4$, amount of carbon=4.0 mass %) for a sodium ion secondary cell was obtained in the same manner as in Example 3-1 except that glucose was not added to the composite $Y^{4'}$.

<<Measurement of Amount of Adsorbed Water>>

The amount of the adsorbed water for each positive electrode active substance obtained in Examples 1-1 to 3-4 and Comparative Examples 1-1 to 3-1 was measured in accordance with the following method.

The amount of water volatilized between a start point and an end point, in which when the positive electrode active substance (composite particle) was left to stand in an environment of a temperature of 20° C. and a relative humidity of 50% for one day to adsorb water until an equilibrium was achieved, the temperature was then raised to 150° C. where the temperature was kept for 20 minutes, and the temperature was then further raised to 250° C. where the temperature was kept for 20 minutes, the start point is defined as the time when raising the temperature was restarted from 150° C., and the end point is defined as the time when the state of the constant temperature at 250° C. was completed, was measured with a Karl Fischer moisture titrator (MKC-610, manufactured by Kyoto Electronics Manufacturing Co., Ltd.) to determine the amount of the adsorbed water in the positive electrode active substance.

The results are shown in Table 1.

TABLE 1

| | Amount supported in 100 mass % of active substance (mass %) | | 250° C. Amount of water (ppm) |
|---|---|---|---|
| | Water-insoluble electrically conductive carbon material | Water-soluble carbon material (expressed in terms of carbon atoms) | |
| Example 1-1 | 3.8 | 1.0 | 410 |
| Example 1-2 | 3.8 | 2.0 | 360 |
| Example 1-3 | 3.8 | 2.9 | 340 |
| Example 1-4 | 3.8 | 4.8 | 500 |
| Example 1-5 | 3.8 | 1.0 | 400 |
| Comparative Example 1-1 | 3.8 | 0.0 | 1350 |
| Example 2-1 | 7.0 | 1.0 | 2120 |
| Example 2-2 | 7.0 | 2.0 | 1580 |
| Example 2-3 | 7.0 | 2.9 | 2200 |
| Example 2-4 | 7.0 | 6.8 | 2810 |
| Comparative Example 2-1 | 7.0 | 0.0 | 3080 |
| Example 3-1 | 4.0 | 1.0 | 370 |
| Example 3-2 | 4.0 | 2.0 | 300 |
| Example 3-3 | 4.0 | 2.9 | 410 |
| Example 3-4 | 4.0 | 6.8 | 810 |
| Comparative Example 3-1 | 4.0 | 0.0 | 1870 |

<<Evaluation of Charge and Discharge Properties Using Secondary Cells>>

Positive electrodes for a lithium ion secondary cell or a sodium ion secondary cell were prepared using each positive electrode active substance obtained in Examples 1-1 to 3-4 and Comparative Examples 1-1 to 3-1. Specifically, the obtained positive electrode active substance, the Ketjen black, and polyvinylidene fluoride were mixed in a blending ratio of 75:20:5 in terms of a mass ratio, N-methyl-2-pyrrolidone was then added thereto, and the resultant mixture was kneaded sufficiently to prepare a positive electrode slurry. The positive electrode slurry was applied on a current collector made of aluminum foil having a thickness of 20 μm using a coating machine to conduct vacuum dry at 80° C. for 12 hours.

Thereafter, it was punched in a ϕ 14 mm disk shape and was pressed using a hand press at 16 MPa for 2 minutes to produce a positive electrode.

Subsequently, a coin type secondary cell was assembled using the positive electrode. As a negative electrode, lithium foil punched in a ϕ 15 mm disk shape was used. As an electrolytic solution, a solution obtained by dissolving $LiPF_6$ (in the case of lithium ion secondary cell) or $NaPF_6$ (in the case of sodium ion secondary cell) in a mixed solvent obtained by mixing ethylene carbonate and ethyl methyl carbonate in a volume ratio of 1:1 so that the concentration of $LiPF_6$ or $NaPF_6$ might be 1 mol/L was used. As a separator, a publicly known separator such as a porous polymer film such as polypropylene was used. These cell parts were incorporated and accommodated under an atmosphere in which the dew point thereof is −50° C. or less by an ordinary method to produce the coin type secondary cell (CR-2032).

Charge and discharge tests were conducted using the produced secondary cells. In the case of the lithium ion cell, the discharge capacity at 1 CA was determined setting the charge conditions to constant current and constant voltage charge at a current of 1 CA (330 mA/g) and a voltage of 4.5 V and setting the discharge conditions to constant current discharge at 1 CA (330 mA/g) and a final voltage of 1.5 V. In the case of the sodium ion cell, the discharge capacity at 1 CA was determined setting the charge conditions to constant current and constant voltage charge at a current of 1 CA (154 mA/g) and a voltage of 4.5 V and setting the discharge conditions to constant current discharge at 1 CA (154 mA/g) and a final voltage of 2.0 V. Further, repeated tests of 50 cycles were conducted under the similar charge-discharge conditions to determine capacity retention rates (%) in accordance with the following formula (2). It is to be noted that all the charge and discharge tests were conducted at 30° C.

Capacity retention rate (%)=(discharge capacity after 50 cycles)/(discharge capacity after 1 cycle)×100 (2)

The results are shown in Table 2.

TABLE 2

|  | Initial discharge capacity at 1 C. (mAh/g) | Capacity retention rate (%) |
|---|---|---|
| Example 1-1 | 155 | 92.5 |
| Example 1-2 | 156 | 93.2 |
| Example 1-3 | 155 | 95.0 |
| Example 1-4 | 145 | 91.0 |
| Example 1-5 | 140 | 92.0 |
| Comparative Example 1-1 | 152 | 86.0 |
| Example 2-1 | 201 | 28.0 |
| Example 2-2 | 211 | 32.0 |
| Example 2-3 | 199 | 27.0 |
| Example 2-4 | 184 | 21.0 |
| Comparative Example 2-1 | 200 | 19.0 |

TABLE 2-continued

|  | Initial discharge capacity at 1 C. (mAh/g) | Capacity retention rate (%) |
|---|---|---|
| Example 3-1 | 116 | 91.0 |
| Example 3-2 | 123 | 93.0 |
| Example 3-3 | 115 | 91.0 |
| Example 3-4 | 104 | 87.0 |
| Comparative Example 3-1 | 112 | 85.0 |

From the results, it found that the positive electrode active substances of Examples can reduce the amount of the adsorbed water more surely and can exhibit more excellent performance in the obtained cells, as compared with the positive electrode active substances of Comparative Examples.

The invention claimed is:

1. A positive electrode active substance, wherein a water-insoluble electrically conductive carbon material comprising graphite and carbon obtained by carbonizing glucose are supported on a compound comprising iron or manganese, wherein the compound is represented by formula (A), (B), or (C):

$$LiFe_aMn_bM^1_cPO_4 \quad (A)$$

wherein $M^1$ represents Mg, Ca, Sr, Y, Zr, Mo, Ba, Pb, Bi, La, Ce, Nd, or Gd, and a, b, and c each represent a number satisfying 0.01≤a≤1, 0.01≤b≤1, 0≤c≤0.2, and 2a+2b+(valence of $M^1$)×c=2;

$$Li_2Fe_dMn_eM^2_fSiO_4 \quad (B)$$

wherein $M^2$ represents Ni, Co, Al, Zn, V, or Zr, and d, e, and f each represent a number satisfying 0≤d≤1, 0≤e≤1, 0≤f<1, 2d+2e+(valence of $M^2$)×f=2, and d+e≠0; and $$NaFe_gMn_hQ_iPO_4 \quad (C)$$

wherein Q represents Mg, Ca, Co, Sr, Y, Zr, Mo, Ba, Pb, Bi, La, Ce, Nd, or Gd, and g, h, and i each represent a number satisfying 0≤g≤1, 0.5≤h≤1, and 0≤i<1, 2g+2h+(valence of Q)×i=2;

wherein if the compound is represented by Formula (A) or (C), an amount of the graphite and the carbon derived from glucose in terms of carbon atoms is a total of from 3.0 to 12.0 mass %, and wherein an amount of carbon derived from glucose is 0.5 to 8.0 mass %; and wherein if the compound is represented by Formula (B), an amount of the graphite and the carbon derived from glucose in terms of carbon atoms is a total of from 4.0 to 15.0 mass %, and an amount of carbon derived from glucose is 0.75 to 10.0 mass %.

2. The positive electrode active substance according to claim 1, wherein the carbon obtained by carbonizing glucose is supported on a composite comprising the compound and the graphite.

3. The positive electrode active substance according to claim 2, wherein in the composite, the graphite is supported on the compound by subjecting the graphite and the compound obtained through hydrothermal reaction to dry mixing.

4. The positive electrode active substance according to claim 3, wherein the dry mixing is mixing wherein the compound and the graphite are subjected to preliminary mixing and subsequently mixed while compressive force and shear force are applied.

5. The positive electrode active substance according to claim 2, wherein the glucose is supported on the compound as carbon obtained through carbonization by subjecting the glucose and the composite comprising the compound to wet mixing and then pyrolyzing.

6. The positive electrode active substance according to claim 1, wherein the compound is represented by the formula (A).

7. The positive electrode active substance according to claim 1, wherein the compound is represented by the formula (B).

8. The positive electrode active substance according to claim 1, wherein the compound is represented by the formula (C).

9. A method for producing a positive electrode active substance, the positive electrode active substance being one wherein a water-insoluble electrically conductive carbon material comprising graphite and carbon obtained by carbonizing glucose are supported on a compound comprising iron or manganese, wherein the compound is represented by formula (A), (B), or (C):

$$LiFe_aMn_bM^1_cPO_4 \qquad (A)$$

wherein $M^1$ represents Mg, Ca, Sr, Y, Zr, Mo, Ba, Pb, Bi, La, Ce, Nd, or Gd, and a, b, and c each represent a number satisfying $0.01 \leq a \leq 1$, $0.01 \leq b \leq 1$, $0 \leq c \leq 0.2$, and $2a+2b+(\text{valence of } M^1) \times c = 2$;

$$Li_2Fe_dMn_eM^2_fSiO_4 \qquad (B)$$

wherein $M^2$ represents Ni, Co, Al, Zn, V, or Zr, and d, e, and f each represent a number satisfying $0 \leq d \leq 1$, $0 \leq e \leq 1$, $0 \leq f < 1$, $2d+2e+(\text{valence of } M^2) \times f = 2$, and $d+e \neq 0$; and $$NaFe_gMn_hQ_iPO_4 \qquad (C)$$

wherein Q represents Mg, Ca, Co, Sr, Y, Zr, Mo, Ba, Pb, Bi, La, Ce, Nd, or Gd, and g, h, and i each represent a number satisfying $0 \leq g \leq 1$, $0.5 \leq h \leq 1$, and $0 \leq i < 1$, $2g+2h+(\text{valence of } Q) \times i = 2$, wherein if the compound is represented by Formula (A) or (C), an amount of the graphite and the carbon derived from glucose in terms of carbon atoms is a total of from 3.0 to 12.0 mass %, and wherein an amount of carbon derived from glucose is 0.5 to 8.0 mass %; and wherein if the compound is represented by Formula (B), an amount of the graphite and the carbon derived from glucose in terms of carbon atoms is a total of from 4.0 to 15.0 mass %, and an amount of carbon derived from glucose is 0.75 to 10.0 mass %; and the method comprising:

(I) subjecting a slurry comprising: a lithium compound or a sodium compound; a phosphoric acid compound or a silicic acid compound; and a metal salt comprising at least an iron compound or a manganese compound to hydrothermal reaction, thereby obtaining a compound X;

(II) adding graphite to the obtained compound X and conducting dry mixing, thereby obtaining a composite Y; and (III) adding glucose to the obtained composite Y before wet mixing and then conducting pyrolysis.

10. The method for producing a positive electrode active substance according to claim 9, wherein in (II), the glucose is added together with the graphite.

11. The method for producing a positive electrode active substance according to claim 9, wherein an amount of the glucose added in (III) is 1.0 to 55.0 mass parts based on 100 mass parts of the composite Y.

12. The method for producing a positive electrode active substance according to claim 9, wherein the dry mixing in (II) is mixing wherein the compound and the graphite are subjected to preliminary mixing and subsequently mixed while compressive force and shear force are applied.

* * * * *